322x
W. Stillman,
Cutting Veneers.
Patented Mar. 16, 1801.
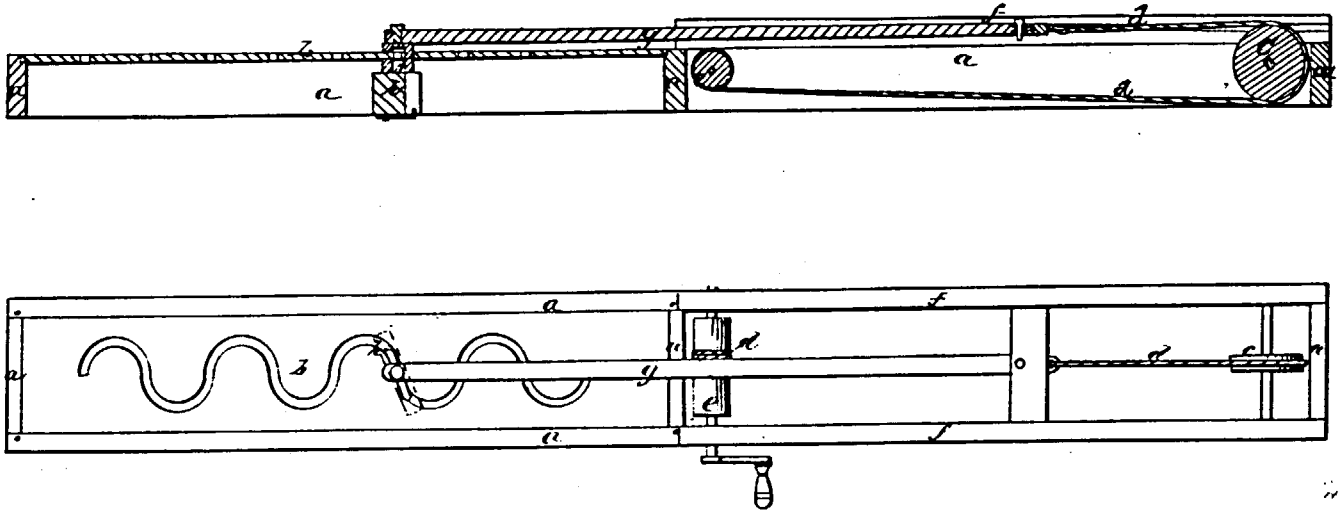

X 0000322

March 16. 1801

William Stillman of Rhode Island

Letters Patent Dated Mar. 16. 1801.

The Schedule referred to in these Letters Patent and making part of the same containing a description in the words of the said William Stillman himself of his improvement called a Veneering Plough.

Specification of a new and useful machine to be called a veneering plough. Invented by William Stillman of Rhode Island. The use of said machine is for cutting the grooves in various forms and figures in Cabinet ware, to be filled with various coloured wood for ornaments in said ware, and does it with much greater precision and dispatch than any thing heretofore known, likewise for cutting the furrows in Corpus ware, and sundry other uses, and is constructed in the following manner. First it has a frame in form of a parallelogram of any size that may be thought proper, suppose for instance six feet in length and eight inches in breadth composed of five pieces, two side pieces for the length, and three short pieces for the width, framed in crosswise, one at each end, and one in the middle; having likewise a thin piece of board called the pattern, about one fourth of an inch thick, to the bigness of the one half of the frame contained between two of the cross pieces, & is supported by its two ends being let in to rabbets in the two cross pieces on which it rests. Through this pattern is cut the figure or figures, that is intended to be cut in the piece of wood designed to be inlaid, then at the other end of the frame hangs a pulley, and at the middle of the frame hangs a winch. Said pulley and winch hang in a couple of pieces, called the winch bits which reach from the end of the frame to the middle thereof of any width at pleasure standing erect on the two side pieces of the frame having a couple of grooves, one on the inside of each of the winch bits, in which slides backward and forward the cross piece of

X 000032 a tongue about the length of the winch bits. and in the end of said
tongue hangs a swivelling stock in form as follows. that part of the
stock which goes through the tongue is round so as to turn like a
pivot. and below the tongue it is wide and becomes into two parts pro
ding downward through the figure in the pattern. These two parts are called
the fore and hinder parts of the square of the stock extending downwards
about half an inch till they pass through the pattern. and then become
one solid piece at the lower end in which is set a steel plough or cutter
with three sharp edges two of which cuts the two sides of the groove &
the third passes under the piece that is taken out so that it cuts quite rou
the piece at once and clears it out at the same time. To then to cut
any figure in the wood you must apply the piece under the frame and
make it fast by means of a bench screw or otherwise and put the pattern in
its place over the piece. then enter the cross piece of the tongue into the
groove in the winch bits. and drop the lower end of the stock through
the figure in the pattern. Then have a cord fastened at one end to the
end of the tongue at the cross piece. The other end of the cord passing rou
the pulley is made fast to the roller of the winch, then bear down a littl
on the stock with the left hand. and with the right hand turn the winch
which winds up the cord and draws forward the tongue forcing the stock
along the figure in the pattern the cutter at the same time reaching down
to the piece of wood under the frame cuts a groove therein in the sa
form of the figure in the pattern the cutter being set in the centre of the st
the fore and hinder parts of the square of the stock. sliding one after the
other along the figure in the pattern, turns the swivel in such manner as to
keep the edges of the cutter always in the direction in which the stock moves.
Then draw back the tongue and turn over the pattern and perform the
same operation and you will have the same figure in the contrary direction
by which means you may cut any figure that you please to form in your
different patterns observing that to cut an oval or circle: only one half of the
figure is formed in the pattern the other half is cut by turning over the patte
and cutting again. ( Note, the cutting of large circles may be performed by

X0000322 setting the cutter in a hoop and carrying it round by hand. likewise cutting straight lines along near the edge of any straight piece of wood. the cutter may be set in a common joiner's guage and forced along by hand. This plough or cutter being a principal object in the invention may be made of any size and applied to various uses Witnesses
W. Crawford
Christopher S. Thorn Wm. Stillman Exd.
W.C.

(938 words)

(Patented 16 March 1801)
(drawing made)